US009285596B2

(12) United States Patent
Soskind et al.

(10) Patent No.: US 9,285,596 B2
(45) Date of Patent: *Mar. 15, 2016

(54) FREE-SPACE COMBINING OF LASER BEAM RADIATION

(71) Applicant: DHPC Technologies, Inc., Woodbridge, NJ (US)

(72) Inventors: Yakov G Soskind, Plainsboro, NJ (US); Richard Gifford, Toms River, NJ (US); Joseph Aletta, Jackson, NJ (US)

(73) Assignee: DHPC TECHNOLOGIES, INC., Woodbridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/861,645

(22) Filed: Apr. 12, 2013

(65) Prior Publication Data

US 2013/0293965 A1  Nov. 7, 2013

Related U.S. Application Data

(63) Continuation of application No. 13/097,156, filed on Apr. 29, 2011.

(51) Int. Cl.
| *G02B 27/10* | (2006.01) |
|---|---|
| *G02B 13/18* | (2006.01) |
| *G02B 3/06* | (2006.01) |
| *G02B 27/12* | (2006.01) |
| *G02B 27/09* | (2006.01) |
| *G02B 19/00* | (2006.01) |

(52) U.S. Cl.
CPC ............ *G02B 27/12* (2013.01); *G02B 19/0014* (2013.01); *G02B 19/0057* (2013.01); *G02B 19/0061* (2013.01); *G02B 27/0961* (2013.01); *G02B 27/0966* (2013.01)

(58) Field of Classification Search
CPC ............. H01L 25/0753; A61B 3/0008; G01N 2201/0612; G01N 2201/062; G01N 2201/0691; G01N 2201/0697; G01N 15/1434; F21V 5/04; F21V 5/043; G02B 21/361; G02B 27/30; G02B 27/0961; G02B 27/0966; H01S 5/405; H01S 5/4081
USPC .................................. 359/619, 621–623, 710
See application file for complete search history.

(56) References Cited

U.S. PATENT DOCUMENTS

| 5,214,485 | A | * | 5/1993 | Sasnett et al. .................. 356/121 |
|---|---|---|---|---|
| 7,538,948 | B2 | | 5/2009 | Muenz et al. |
| 2006/0221459 | A1 | | 10/2006 | Sagan |
| 2007/0106284 | A1 | | 5/2007 | Siegel |
| 2007/0268572 | A1 | | 11/2007 | Hu et al. |

OTHER PUBLICATIONS

Uwe Brauch et al, High Power Diode Laser for Direct Applications, Applied Physics vol. 78, p. 303-368.*

* cited by examiner

*Primary Examiner* — Alicia M Harrington
(74) *Attorney, Agent, or Firm* — Stuart H. Mayer; Mayer & Williams PC

(57) ABSTRACT

A diode laser beam combining apparatus for producing a high combined beam power density in the far field at reduced levels of power consumption and heat dissipation includes an array of semiconductor laser emitters arranged in a collinear manner. The apparatus includes a cylindrical lens for collimating emitter beams generated by the laser emitters in a direction perpendicular to a junction plane of the laser emitters. The apparatus further includes a micro-optic array and a long focal length cylindrical lens. The micro-optic array is configured to perform a rotational transformation of the collimated emitter beams. The micro-optic array has a lateral spacing in a direction parallel to the junction plane of the laser emitters that matches the emitter pitch. The long focal length cylindrical lens collimates emitter beams in the direction perpendicular to the junction plane after passing through the micro-optic array.

12 Claims, 6 Drawing Sheets

FREE-SPACE COMBINING OF LASER BEAM RADIATION

CROSS REFERENCE TO RELATED APPLICATION

This application is a continuation of U.S. application Ser. No. 13/097,156, filed Apr. 29, 2011 entitled FREE-SPACE COMBINING OF LASER BEAM RADIATION, the application is hereby incorporated by reference in its entirety.

FIELD OF THE INVENTION

The present invention relates to a technique that performs free-space beam combining of several individual laser emitters. More specifically, it relates to a diode laser beam combining technique that is capable of producing high power density combined beams from a limited number of laser beams with reduced power consumption.

BACKGROUND OF THE INVENTION

Recent trends in laser technology development are characterized by the introduction of small size coherent emitters, such as fiber lasers, as well as high-power semiconductor diode lasers. High output beam power from a laser module is commonly achieved by combining several output beams from the individual emitters into a single output beam.

Various beam combining approaches were developed in the past, including coherent beam combining, spectral beam combining (also known as or wavelength multiplexing), as well as geometrical beam combining Geometrical beam combining does not require precise phase control, as is in the case of coherent beam combining. It also does not require control of the emission wavelength of the individual combined beams, as compared to spectral beam combining. Therefore, geometrical beam combining represents a cost-effective technique of increasing output power that is relatively easy to implement.

Geometrical beam combining is often applied to high power diode lasers and laser bars. Broad area high power diode laser emitters have emitting apertures with substantially different lateral dimensions, as well as different beam quality and respective beam divergences in the two orthogonal directions. The typical size of an emitting aperture from a broad area high power diode laser in the direction perpendicular to the diode p-n junction plane, also called the fast axis direction, is of the order of 1 micron. The size of an emitting aperture in the diode p-n junction plane, also known as the slow axis direction, is significantly larger, and is typically between 50 and 200 microns. In the fast axis direction the output beam from diode laser emitting apertures exhibits single mode emission with diffraction-limited beam quality. The typical beam divergence angle in the fast axis direction is 300-600. In the slow axis direction the output beam from diode laser emitting apertures exhibits highly multi-mode emission characteristics with reduced beam quality. The typical beam divergence angle from the emitting apertures in the slow axis direction is 60-140. Laser emitter beam quality is inversely proportional to the étendue parameter, which is defined as a product of the emitter lateral size times the far field divergence angle of the emitted beam. The highest, diffraction-limited beam quality is achieved with Gaussian-shaped beams representing the fundamental TEM00 radiation mode. The beam quality in the fast axis direction is near diffraction limited and is close to the fundamental TEM00 radiation mode. Emission along the slow axis direction is highly multimode, and the beam quality is approximately 1000-2000 times lower than the diffraction limited beam quality in the fast-axis direction.

To reduce the size and assembly cost of the high power laser modules the broad area diode lasers are often fabricated in the form of emitter arrays, sometimes also called diode bars, which contain several lithographically fabricated individual emitters on a single substrate. The diode bars provide lower cost packaging with significantly higher spatial registration accuracy between the individual emitters, as compared to packaging of an equal number of individual diode laser emitters. A typical commercially available high power diode laser bar contains 19-25 emitters with a lateral emitter spacing, or pitch, of about 0.2 mm-0.5 mm. The fill factor of the diode bar is defined as a ratio of the slow axis aperture size to the emitter spacing. A typical diode bar fill factor ranges between about 0.2 and 0.5. Fill factor less than 1.0 causes degradation of the combined output beam quality in the slow axis direction.

During fabrication process the laser bars are attached to sub-mounts that supply the bars with electrical current and draw away the excessive heat. Due to manufacturing imperfections and packaging stress, the individual emitting apertures within the bar are laterally displaced from a straight line connecting the two emitters at the bar margins. This deviation of the emitting apertures from a straight line, known in the literature as a "smile", may reach several microns over an emitting apertures spacing of about 10-20 mm.

The differences in the output beam emission characteristics of the high power diode laser emitters lead to highly elongated far field beam patterns. Beam transformation techniques can be employed to reduce the far field beam shape differences of the combined beam in the two orthogonal directions.

Both reflective and refractive techniques may be employed to perform the beam transformations, as shown in several US patents. For example, U.S. Pat. No. 7,286,308 describes a reflective arrangement for beam transformation based on total internal reflection in prism arrays. U.S. Pat. No. 7,027,228 describes a refractive arrangement for rotational transformation of the beam based on micro-lens arrays.

The beam transforming optics is often supplied as a monolithic micro-optics block that performs collimation of the emitter beams in the fast axis direction and rotation of the individual collimated beams. Rotational transformation orients the slow axes of the individual emitter beams perpendicular to the p-n junction plane, and the fast axis in the direction of the p-n junction plane of the diodes. After rotational transformation the beam is no longer diffraction limited in the fast axis directions. The beam quality in the fast axis direction is reduced, while the beam quality in the slow axis direction is improved.

The laser beam combiners that perform rotational transformation based on commercially available micro-optics assemblies (e.g., Lissotchenko Mikrooptik beam transformation modules BTS and CBTS series) are highly sensitive to the diode bar smile and component misalignments which occur during the fabrication process. The bar smile and misalignments manifest themselves as the combined beam distortions and reduction in the far field power density.

During the beam-combining process the beam transforming micro-optics module is actively aligned and bonded with respect to the diode bar emitting apertures. Post bonding shifts can cause changes in the module position and orientation with respect to the emitting apertures. The changes lead to an increase in the output combined beam far field divergence and the associated reduction in the far field power density.

While reduction in the power density due to the bar smile and component misalignments can be offset by an increase in the number of combined laser emitters, the larger number of emitters will also lead to an associated increase in the power consumption and the laser module power dissipation. In applications with a limited amount of supplied power the increase in the number of combined emitters, as well as the increase in heat dissipation, is highly undesirable.

In view of the foregoing, it would be desirable to provide a diode laser beam combining module for producing high far field power density of the combined output beam with a limited number of individual laser emitters and reduced power consumption and generated heat.

It would be also desirable to provide a diode laser beam combining and collimation module that produces a far field collimated output beam with comparable divergence values in both the horizontal and the vertical lateral directions.

It would be also desirable to provide a diode laser beam combining and collimation module with a reduced length in the propagating beam direction.

SUMMARY OF THE INVENTION

In view of the foregoing, one object of the present invention is to provide a semiconductor diode laser bar beam combining module that produces a high combined beam power density in the far field with a limited number of combined laser beams and a reduction in power consumption and generated heat.

It is another object of the present invention to provide a diode laser beam combining and collimation module that produces a low output combined beam far field angular divergence with the far field beam size being comparable in both the horizontal and the vertical lateral directions.

It is still another object of the present invention is to provide a diode laser free-space beam combining and collimation module with a reduced axial length.

The objectives of the present invention are achieved by an appropriate selection of the beam transforming optics characteristics, as well as the lateral spacing between the emitters in the diode bar, as will be explained in detail in the following embodiments.

The features of the present invention including construction and operational details of the preferred embodiments will now be described in more detail with reference to the accompanying drawings.

DETAILED DESCRIPTION

The present invention will be further described in detail in the form of the specific embodiments. However, the present invention is not limited to the specific embodiments.

High power density of the combined output laser beam with reduced levels of the module power consumption and generated heat is achieved by an appropriate selection of the beam transforming optics characteristics, as well as the lateral emitter spacing in the diode bar, as will be explained in detail in the following embodiments.

The beam quality of a nominal undistorted high power diode laser beam in the fast axis direction is diffraction-limited. Unfortunately, due to manufacturing imperfections and components misalignments the combined beam quality is degraded.

Figure 1A:
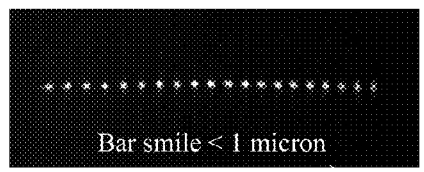
FIGS. 1A-1B present images of the diode laser bars with different smile values.
Figure 1B:

FIGS. 1A-1B shows the emitting apertures of two semiconductor diode laser bars with different amounts of smile. Each bar contains 19 emitters with a lateral spacing p=0.5 mm. FIG. 1A presents an image of the emitting apertures from a diode bar with a smile less than 1 micron over the bar size of 9.5 mm. This level of flatness is difficult to achieve with high yields. FIG. 1B presents an image of the emitting apertures from a diode bar with a smile value of approximately 3 microns over an emitter distance of 9.5 mm. This level of flatness can be achieved with significantly higher yields.

Figure 2A:
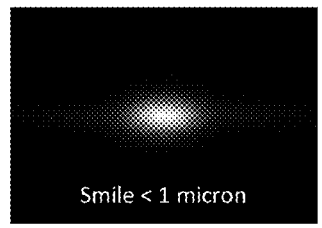
FIGS. 2A-2B present the combined beam far field irradiance distributions corresponding to the different smile values shown in FIG. 1.
Figure 2B:
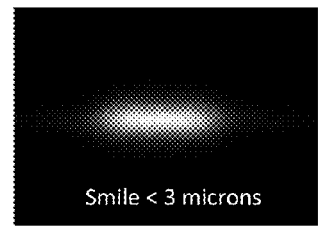

FIGS. 2A-2B show the far-field distributions of a combined beam from 19 individual emitters using commercially available beam transformation micro-optics modules, which are in the BTS series manufactured by Lissotchenko Mikrooptik and which are designed for an emitter width 0.15 mm and a pitch of 0.5 mm. The far-field distributions correspond to the two different values of the laser bar smile shown in FIGS. 1A and 1B. The BTS module consists of a fast axis collimating lens and a beam transforming microlens array integrated into a single micro-optics module. The differences in the diode bar smile are reflected in an almost 3 times increase in the far-field horizontal beam size, as shown in FIGS. 2A and 2B, respectively. The beam shape becomes elongated with reduced far-field power density.

Misalignments of the beam transforming optics with respect to the diode laser bar also contribute to a reduction in the far-field combined beam power density. Even in case of active alignment of the beam transforming optics the post-bonding or post-welding shifts cause an increase in the far-field beam divergence.

Figure 3A:
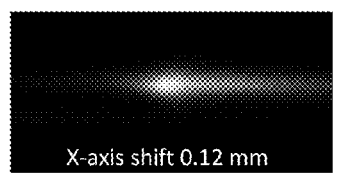
FIGS. 3A-3D present the combined beam far field irradiance distribution corresponding to different misalignments of the beam transformation micro-optics.
Figure 3B:
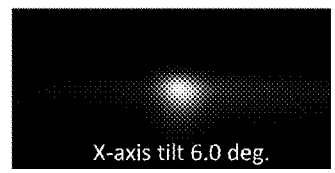
Figure 3C:
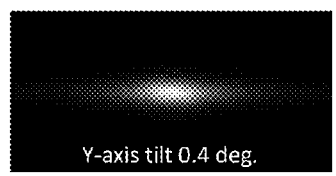
Figure 3D:
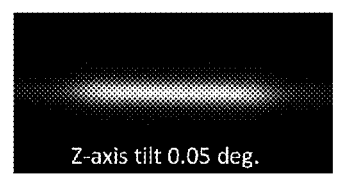

FIGS. 3A-3D presents the far-field beam distributions from 19 combined emitters with a width of 0.15 mm and a pitch p=0.5 mm in the presence of different misalignments. FIG. 3A corresponds to a 0.12 mm X-axis lateral shift of the BTS module with respect to the diode laser bar. FIG. 3B corresponds to a 6.0 deg. angular tilt of the BTS module with respect to the diode bar in the slow axis direction corresponding to the p-n junction plane (X-axis). FIG. 3C corresponds to a 0.4 deg. angular tilt between the BTS module and the diode bar in the fast axis direction (Y-axis). FIG. 3D corresponds to a 0.05 deg. angular tilt between the BTS module and the diode bar with respect to the propagation axis direction (Z-axis).

In several laser applications, including free-space optical communications and remote sensing, it is generally important to produce specific values of the optical power density in the combined beam at specific operating distances. In the presence of the diode bar smile and optics misalignments the combined beam far field power density is reduced, and the required power density can be achieved only by increasing the number of laser diodes in the combined beam. That will lead to an increase in the module's power consumption, as well as an increase in heat dissipation. In systems with limited availability of supplied electrical power the increase in the number of combined diodes is not possible. Therefore, it is necessary to find alternative solutions to increase the combined beam far field power density without increasing the number of the individual combined emitters and a commensurate increase in the module's power consumption and heat dissipation.

First Embodiment

According to the present invention the required power density in the far field of the combined beam is achieved with a limited number of emitting diodes and a commensurate reduction in power consumption and heat dissipation by selecting appropriate focal lengths for the collimating optics, as well as the lateral spacing between the emitting apertures within the diode bar.

The far-field angular beam size $\theta_{FF}$ is defined as a combination of the diffraction term $\theta_{FF}^{Diffr}$ and geometrical term $\theta_{FF}^{Geom}$:

$$\theta_{FF} = \theta_{FF}^{Diffr} + \theta_{FF}^{Geom} \quad (1)$$

The diffraction term $\theta_{FF}^{Diffr}$ represents the contribution to the angular beam size by diffraction effects on the optics apertures, and is proportional to the operating wavelength $\lambda$ and is inversely proportional to the effective aperture size $D_{eff}$:

$$\theta_{FF}^{Diffr} = \frac{\lambda}{D_{eff}} \quad (2)$$

The second term $\theta_{FF}^{Geom}$ represents the contribution to the far-field angular beam size due to misalignment effects and component imperfections. The geometrical beam divergence term in the fast axis direction $\theta_{FF}^{Geom}$ is proportional to the diode bar "smile value" $h_S$, as well as optics misalignments such as those caused by post-bonding shifts $h_M$:

$$\theta_{FF}^{Geom} = \frac{h_S + h_M}{f_C} \quad (3)$$

The values of $h_S$ and $h_M$ depend on the specific packaging process details, and are usually difficult to reduce without significant additional investment or reductions in yield.

Combining the equations (1) through (3), the far-field beam divergence angle in the fast axis direction $\theta_{FA}$ can be written as:

$$\theta_{FA} = \theta_{FA}^{Diffr} + \theta_{FA}^{Geom} = \frac{\lambda}{D_{eff}} + \frac{h_S + h_M}{f_C} \quad (4)$$

In the slow axis direction the individual emitter fields are multimode, and the slow axis beam divergence is dominated by the geometrical term. After the beam transforming optics the power density in the slow axis direction is proportional to the number of combined emitters contained in the array.

The size of the individually combined beams at the beam transforming micro-lens array in the slow axis direction increases with increase in the focal length $f_C$ of the fast axis collimator. When the size of the individual beams at the beam-transforming array exceeds the aperture size of the micro-lens elements, the beam outside of the aperture margins is truncated, so that the portions of the combined beams outside of the aperture margins no longer contribute to the power density in the combined output beam. To prevent beam truncation at the microlens' aperture margins, the emitter pitch needs to be increased to accommodate the increase in the fast axis collimator focal length. The pitch p of the emitter array in the diode bar should also match the pitch of the beam transforming micro-optics array in the slow-axis direction.

For a given amount of the geometrical distortions $h_S + h_M$ selection of the fast axis collimator focal length is very important. When the selected focal length of the fast axis collimator is too short, the contribution of the geometric distortion term $\theta_{FA}^{Geom}$ to the far field beam divergence exceeds the contribution of the diffraction term $\theta_{FA}^{Diffr}$. In this case the required far field power density cannot be achieved without increasing the number of combined emitters and a commensurate increase in the module power consumption and heat dissipation.

When the focal length of the fast axis collimator is too long, the far field beam divergence contribution from the geometrical term $\theta_{FA}^{Geom}$ is low, and the far field beam divergence is dominated by the diffraction term $\theta_{FA}^{Diffr}$. The long focal lengths of the fast axis collimator lead to a reduction in the number of the individual emitters contributing to the far field power density in the slow axis direction of the combined beam, therefore leading to a reduction in the far field power density of the combined beam.

In accordance with the present invention the highest far field power densities in the combined beam at the reduced electrical power consumption and reduced heat dissipation are achieved when the fast axis collimator focal length and the emitter pitch are selected from within specific optimum ranges.

It was found that the highest far-field power density in the combined beam and lowest consumed electrical power, as well as the heat dissipation are achieved by selecting of the focal length of the fast axis collimator from within the range of 0.7 mm-2.5 mm, while selecting the diode emitter pitch p and the associated beam transforming microlens array spacing in the slow axis direction from within the range of about 0.7 mm-2.5 mm.

In accordance with the first embodiment of the present invention the focal length of the fast axis collimating lens was 1.0 mm, and the pitch value of the diode emitters in the bar was also 1.0 mm. For comparison, commercially available BTS series beam transforming modules employ fast axis collimators with focal lengths of 0.29 mm, while commercially available diode laser bars are produced with emitter pitch values within a range of about 0.2 mm-0.5 mm.

Figure 4A:
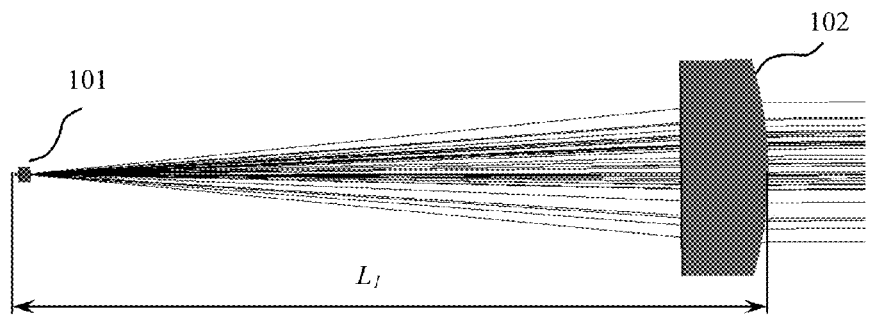
FIGS. 4A-4D present a free space beam combining arrangement in accordance with a first embodiment of the present invention.
Figure 4B:
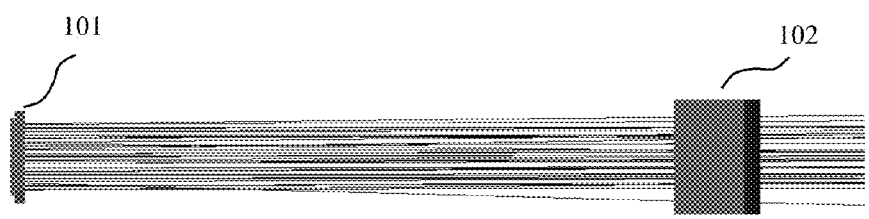
Figure 4C:
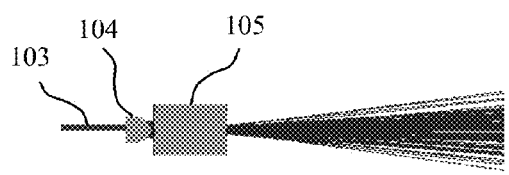
Figure 4D:
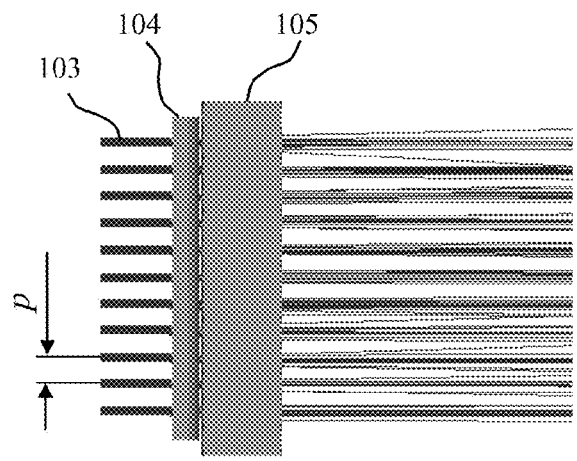

FIGS. 4A through 4D present the first embodiment of the present invention, which employs free space beam combining of the individual emitters optimized with respect to the far field optical power density and the consumed electrical power, as well as the dissipated heat. FIG. 4A shows a side-view of the first embodiment that includes a diode bar with a micro-lens assembly unit 101 and a cylindrical collimating lens 102. The figure also shows the axial distance between the laser diode emitters and the outer surface of the collimating lens 102, which is designated as L1. FIG. 4B shows a top view of the first embodiment. The embodiment employs a laser diode bar, fast axis collimating cylindrical lens, as well as the micro-lens array that performs a rotational transformation of the beams after passing through the fast axis collimator. The cylindrical lens 102 collimates the emitter beams generated by the laser bar emitters in a direction perpendicular to a junction plane. The micro-lens lateral spacing in the array matches the emitter pitch, which is defined as the lateral spacing between the emitting apertures in the laser diode bar. FIGS. 4C and 4D show additional details of the diode bar with the micro-lens assembly unit 101. FIG. 4C presents a side view of the diode bar with the micro-lens assembly unit 101 consisting of the individual laser diode waveguides 103, fast axis cylindrical collimating lens 104, and the beam transforming micro-lens array 105, which performs rotational transformation of the individual emitter beams after passing through the fast axis collimating lens 104. FIG. 4D presents a top view of the diode bar with the micro-lens assembly unit 101, showing 10 individual emitting waveguides 103 with a lateral separation, or pitch, p=1.0 mm. The fast axis cylindrical lens 104 collimates the emitter beams generated by the laser bar emitters in a direction perpendicular to a junction plane. The cylindrical lens 102 collimates the combined output laser beam in a direction perpendicular to a junction plane after the beam transforming micro-lens array 105. The focal lengths of the cylindrical collimating lenses 105 and 102 in accordance with the first embodiment of the present invention were 1.0 mm and 100.0 mm, respectively. The axial length L1 shown in FIG. 4A was 106.5 mm.

Figure 5A:
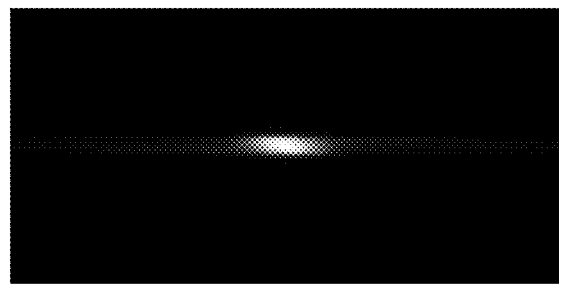
FIGS. 5A-5C present the far field irradiance distribution produced by the beam combining arrangement in accordance with the first embodiment of the present invention.
Figure 5B:
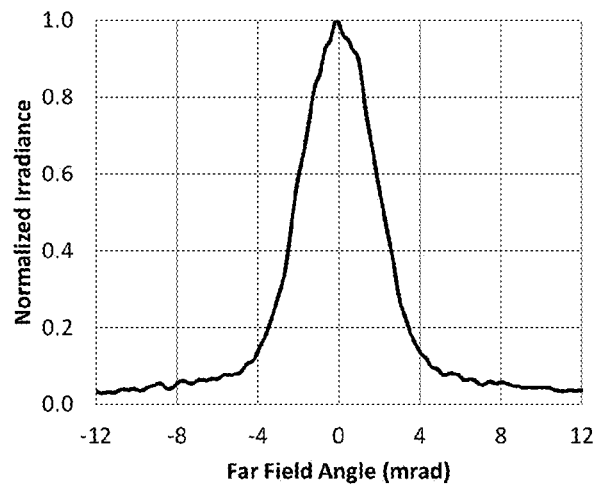
Figure 5C:
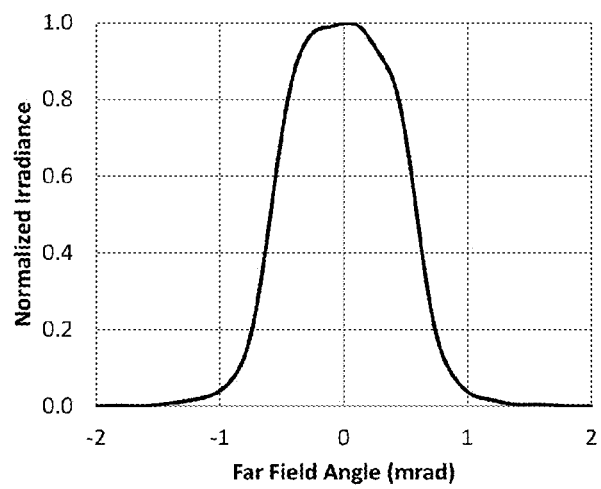

FIG. 5A presents the relative far-field distributions of the combined beam in accordance with the first embodiment of the present invention. FIG. 5a shows the two-dimensional far field distribution. The far field pattern is elongated with an aspect ratio of about 3.5-5.0, depending on the relative levels of the beam intensity. FIGS. 5B and 5C present the normalized intensity cross-sections of the combined beam far field angular distributions in the horizontal and the vertical directions, respectively. The far field beam divergence at the full-width half maximum (FWHM) intensity level in the horizontal and the vertical directions is 4.5 mrad and 1.2 mrad, respectively.

Second Embodiment

Several laser applications require high combined collimated beam far field power density at the lowest consumed electrical power and heat dissipation levels within the module with a precisely controlled far field aspect ratio α. The beam aspect ratio α is defined as the ratio of the beam cross-sections in the two orthogonal lateral directions. Several applications may require the combined output laser beam to be square-shaped, with approximately equal beam divergences in the two orthogonal lateral directions and an aspect ratio α=1.

In the slow axis direction the output beam divergence is dominated by the geometrical divergence term. The far field beam divergence in the slow axis direction can de estimated as:

$$\theta_{SA} = \frac{w_{SA}}{f_{SA}} \quad (5)$$

where $w_{SA}$ is the width of the individual emitter apertures in the slow axis direction, and $f_{SA}$ is the focal length of the cylindrical lens that collimates the combined output laser beam in a direction perpendicular to a junction plane after the beam transforming micro-lens array. The lateral width of high power diode laser emitters is usually 0.05 mm-0.20 mm. To achieve low beam divergences in the combined output beam perpendicular to a junction plane, long focal lengths $f_{SA}$ are required for the cylindrical collimator lenses.

According to the second embodiment of the present invention, the required far field aspect ratio of the combined collimated beam is achieved by an appropriate selection of the focal lengths of the two collimating lenses. For example, a square-shaped far field collimating beam is achieved when the ratio of the collimating lens focal length $f_{SA}$ to the fast axis collimating lens focal length $f_{FA}$ satisfies the following relation:

$$\frac{f_{SA}}{f_{FA}} = \frac{w_{SA}}{\frac{\lambda}{2\tan(\varphi_{FA})} + h_S + h_M} \quad (6)$$

For an emitting waveguide width in the slow axis direction $w_{SA}$=0.15 mm the focal length ratio $f_{SA}/f_{FA}$ is selected from within the range of about 50-250. Specifically, when the fast axis collimator focal length $f_{FA}$ is 1.0 mm, the focal length $f_{SA}$ is selected to be within about 50 mm-250 mm. In contrast, commercially available BTF modules have significantly smaller focal length ratios, typically within the range of 15 to 45.

Figure 6A:
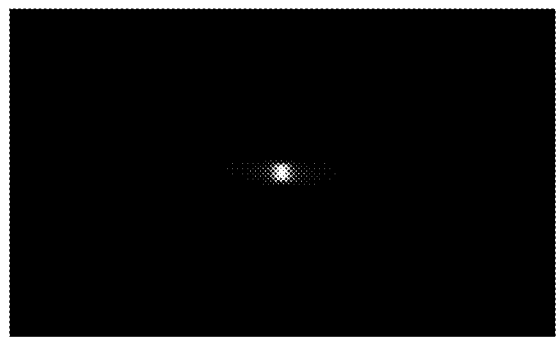
FIGS. 6A-6C present the far field irradiance distribution produced by a beam combining arrangement in accordance with a second embodiment of the present invention.
Figure 6B:
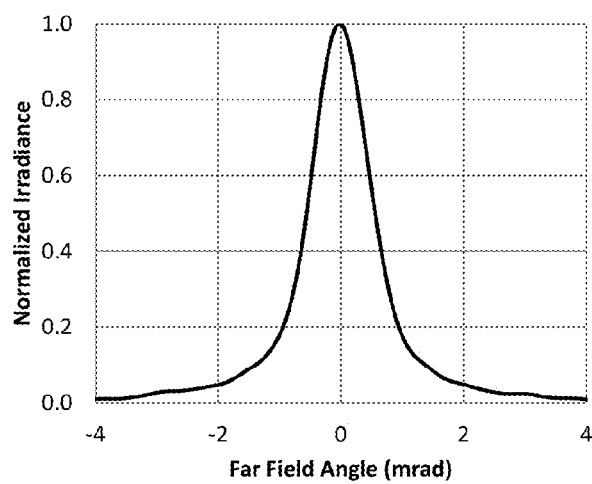
Figure 6C:
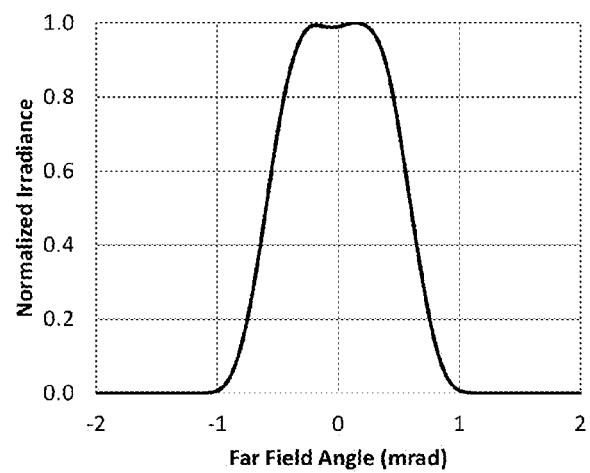

FIGS. 6A through 6C present two-dimensional far field intensity distributions produced by the beam combining module in accordance with the second embodiment of the present invention. The second embodiment includes a semiconductor diode laser bar, a micro-lens assembly unit, and a cylindrical lens that collimates the combined output laser beam in a direction perpendicular to a junction plane after the beam transforming micro-lens unit similar to the arrangement shown in FIG. 4 for the first embodiment. Selection of the collimating lens focal length value $f_{SA}$ is made based on the equation (6).

FIG. 6A shows the two-dimensional far field intensity distribution in accordance with the second embodiment of the present invention. The far-field beam is approximately square in shape in the two orthogonal directions. FIG. 6B shows the far field intensity cross-sections of the intensity distribution in the plane of the diodes p-n junctions, where the far field beam divergence is 1.2 mrad at the FWHM level. FIG. 6c presents the normalized intensity cross-section of the far field intensity distribution in the plane perpendicular to the p-n junction, where the far field beam divergence is 1.2 mrad at FWHM of the peak value. Employment of a wider pitch value equal to about 1.5 mm between the individual emitters in the diode bar and the 1.5 mm focal length of the fast axis collimating optics leads to a reduction in the combined beam far field divergence values in the direction of the p-n junction plane. As a result, the achieved far field beam size is square-shaped and has comparable divergence values in the two orthogonal lateral directions.

Third Embodiment

As discussed in connection with the previous embodiment, long focal length cylinder collimating lenses are employed after the beam transforming micro-optics to produce low diverging far field combined beams in the direction perpendicular to a junction plane. The long focal length of the cylindrical collimating lens after the beam transforming micro-optics leads to a significant increase in the axial size of the packaged laser module.

To reduce the axial module size while maintaining a low slow axis output beam divergence in accordance with the third embodiment of the present invention a composite collimating assembly after the beam transforming micro-optics is employed. The collimating assembly includes at least two cylindrical lenses, one with a negative optical power and one with a positive optical power. The collimating assembly may also include a mechanism to adjust the axial spacing between the positive and the negative lenses of the assembly. Adjustment of the axial spacing will change the effective focal length of the assembly. According to equation (5) changes in the effective focal length of the collimating assembly lead to adjustments in the combined beam far field beam divergence in the direction perpendicular to a junction plane. Therefore, changing the spacing between the lens components in the collimating lens assembly allows the combined beams to be reshaped in the far field. A desired combined beam aspect ratio can be achieved using this technique. For instance, when a combined beam aspect ratio less than 2 is required, the effective focal length of the collimating assembly is adjusted to satisfy the equation (6).

Figure 7A:
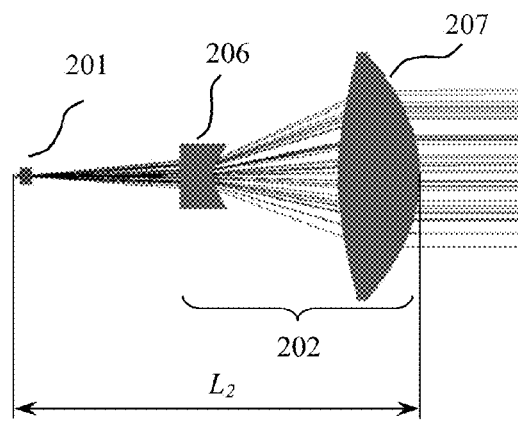
FIGS. 7A-7B present a free space beam combining arrangement in accordance with a third embodiment of the present invention.
Figure 7B:
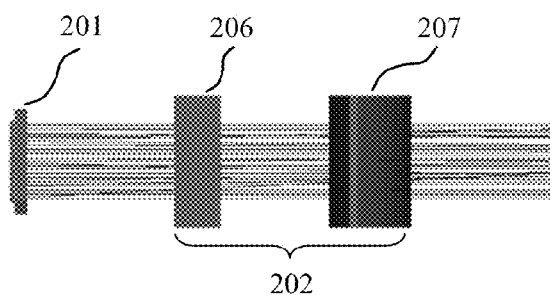

FIGS. 7A and 7B present the beam combining module in accordance with the third embodiment of the present invention. FIG. 7A shows a side-view of the third embodiment, which includes a micro-lens assembly unit 201 and a cylindrical collimating lens unit 202 located after the beam transforming micro-lens unit 201. The collimating unit 202 is comprised of a negative optical power lens 206 and a positive optical power lens 207. The negative cylindrical lens 206 is employed to increase the combined beam divergence in the direction perpendicular to a junction plane. The positive cylindrical lens 207 is employed to collimate the diverging beam after the negative lens 206. The figure also shows the axial distance L2 between the diode emitter apertures and the outer surface of the positive lens 207. FIG. 7B shows the top view of the third embodiment.

Employment of the lens combination 206 and 207 as part of the collimating unit 202 in accordance with the third embodiment of the present invention allows a significant reduction in the axial length L2 of the laser module, as compared to the axial distance L1 of a laser module with a single collimating cylindrical lens 102 in accordance with the first embodiment shown in FIG. 4A. The nominal axial length L2 in accordance with the third embodiment of the present invention was about 15.0 mm, and the effective focal length of the lens module 202 was adjusted to be approximately 120 mm, hence reducing the axial length of the beam combining assembly by more than twice, as compared to the first embodiment of the present invention shown in FIG. 4A.

The cylindrical collimating unit 202 in accordance with the third embodiment of the present invention may optionally include a means for adjusting the axial distance between the negative 206 and the positive 207 lenses of the unit. Adjustments in the axial spacing between the lenses 206 and 207 can be performed during active alignment process to achieve required aspect ratio of the combined beam far field pattern. The active alignment is a standard technique employed during fabrication of laser modules. Alternatively a linear actuation mechanism may be employed within the package to adjust the far field combined beam shape during laser operation. The actuation mechanism can be based on common designs, such as piezo or ball drive actuator designs. The adjustment in the axial distance between the lenses 206 and 207 of the collimating lens unit 202, leads to changes in the effective focal length of the lens unit 202. According to the third embodiment, adjustment in the axial spacing between the components of the collimating lens unit 202 is employed to shape the far field distribution of the combined beam. In particular, a specific required value for the combined beam far field aspect ratio can be achieved, even in the presence of a diode bar smile and component misalignments, by adjusting the axial lens spacing to cause respective changes in the combined beam far field aspect ratio. For example, a far field beam with an aspect ratio of approximately one can be produced using this focal length adjustment technique.

Figure 8A:
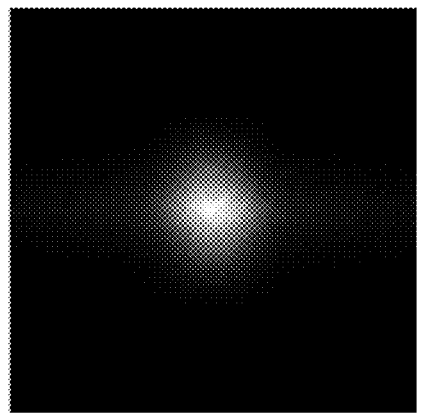
FIGS. 8A-8B present the far field irradiance distributions produced by the beam combining arrangement in accordance with the third embodiment of the present invention
Figure 8B:
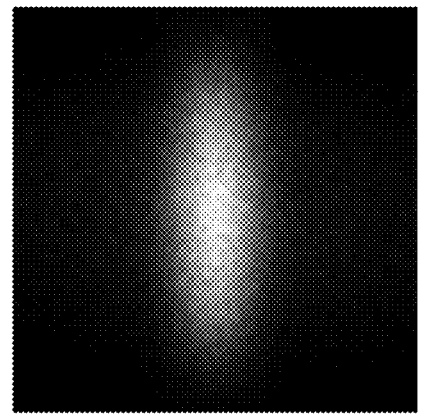

FIGS. 8A and 8B present the combined beam far field distributions in accordance with the third embodiment of the present invention. FIG. 8A shows the combined beam far field distribution when the axial distance L2 between the lenses 206 and 207 was adjusted to approximately 15.0 mm and yielding a far field beam with an aspect ratio of approximately one. FIG. 8B shows the combined beam far field distribution when the axial distance L2 between the lenses 206 and 207 was adjusted to approximately 14.6 mm and yielding an elongated far field beam with an aspect ratio of approximately three.

What is claimed is:

1. A diode laser beam combining apparatus for producing a high combined beam power density in the far field at reduced levels of power consumption and heat dissipation, comprising:
    an array of semiconductor laser emitters arranged in a collinear manner with respect to each other and having an emitter pitch between 0.7 mm and 2.5 mm;
    a cylindrical lens for collimating emitter beams generated by the array of laser emitters in a direction perpendicular to a junction plane of the laser emitters;
    a micro-optic array configured to perform rotational transformation of the collimated emitter beams, said micro-optic array having a lateral spacing in a direction parallel to the junction plane of the laser emitters that matches the emitter pitch; and
    a long focal length cylindrical lens for collimating emitter beams in the direction perpendicular to the junction plane after passing through the micro-optic array, wherein the cylindrical lens has a focal length $f_C$ selected in accordance with the equation:

$$\theta_{FA} = \frac{\lambda}{D_{eff}} + \frac{h_S + h_M}{f_C}$$

where $\theta_{FA}$ is a far-field divergence angle in a fast axis direction, $h_S$ is a diode bar smile value, $h_M$ represents optics misalignments, $\lambda$ is a wavelength of propagating radiation, and $D_{eff}$ represents an effective aperture size of the cylindrical lens.

2. The beam combining apparatus according to claim 1, wherein the cylindrical lens for collimating emitter beams generated by the array of laser emitters in a direction perpendicular to a junction plane has a focal length between 0.7 mm and 2.5 mm.

3. The beam combining apparatus according to claim 1, wherein a ratio of focal lengths of the long focal length cylindrical lens and the cylindrical lens is between 50 and 250.

4. A diode laser beam combining apparatus for producing a high combined beam power density in the far field at reduced levels of power consumption and heat dissipation, comprising:
  an array of semiconductor laser emitters arranged in a collinear manner with respect to each other and having an emitter pitch;
  a cylindrical lens for collimating emitter beams generated by the array of laser emitters in a direction perpendicular to a junction plane of the laser emitters, said cylindrical lens having a focal length between 0.7 mm and 2.5 mm;
  a micro-optic array configured to perform rotational transformation of the collimated emitter beams, said micro-optic array having a lateral spacing in a direction parallel to the junction plane of the laser emitters that matches the emitter pitch; and
  a long focal length cylindrical lens for collimating emitter beams in the direction perpendicular to the junction plane after passing through the micro-optic array, wherein the long focal length cylindrical lens has a focal length $f_{SA}$ selected in accordance with the following equation:

$$f_{SA} = \frac{w_{SA}}{\theta_{SA}}$$

where $\theta_{SA}$ is a far-field divergence angle in a slow axis direction, and $w_{SA}$ is an aperture width of individual emitters in the slow axis direction.

5. The beam combining apparatus according to claim 4, wherein said emitter pitch is between 0.7 mm and 2.5 mm.

6. The beam combining apparatus according to claim 4, wherein a ratio of focal lengths of the long focal length cylindrical lens and the cylindrical lens is between 50 and 250.

7. The beam combining apparatus according to claim 4, wherein the cylindrical lens has a focal length $f_C$ selected in accordance with the equation:

$$\theta_{FA} = \frac{\lambda}{D_{eff}} + \frac{h_S + h_M}{f_C}$$

where $\theta_{FA}$ is a far-field divergence angle in a fast axis direction, $h_S$ is a diode bar smile value, $h_M$ represents optics misalignments, $\lambda$ is a wavelength of propagating radiation, and $D_{eff}$ represents an effective aperture size of the cylindrical lens.

8. A diode laser beam combining apparatus for producing a high combined beam power density in the far field at reduced levels of power consumption and heat dissipation, comprising:
  an array of semiconductor laser emitters arranged in a collinear manner with respect to each other and having an emitter pitch between 0.7 mm and 2.5 mm;
  a cylindrical lens for collimating emitter beams generated by the array of laser emitters in a direction perpendicular to a junction plane of the laser emitters, the cylindrical lens having a focal length $f_{FA}$;
  a micro-optic array configured to perform rotational transformation of the collimated emitter beams, said micro-optic array having a lateral spacing in a direction parallel to the junction plane of the laser emitters that matches the emitter pitch;
  a long focal length cylindrical lens for collimating emitter beams in the direction perpendicular to the junction plane after passing through the micro-optic array, the long focal length cylindrical lens having a focal length $f_{SA}$;
  wherein a ratio of the focal length $f_{SA}$ of the long focal length cylindrical lens to the focal length $f_{FA}$ of the cylindrical lens is selected in accordance with the equation:

$$\frac{f_{SA}}{f_{FA}} = \frac{w_{SA}}{\frac{\lambda}{2\tan(\theta_{FA})} + h_S + h_M}$$

where $w_{SA}$ is a width of an individual emitter aperture in a slow axis direction, $h_S$ is a diode bar smile value, $h_M$ represents optics misalignments, $\lambda$ is a wavelength of propagating radiation, and $\theta_{FA}$ represents a far-field divergence angle in a fast axis direction.

9. The beam combining apparatus according to claim 8, wherein a ratio of focal lengths of the long focal length cylindrical lens and the cylindrical lens is between 50 and 250.

10. The beam combining apparatus according to claim 8, wherein a focal length of the long focal length cylindrical lens $f_{SA}$ is selected in accordance with the equation:

$$f_{SA} = \frac{w_{SA}}{\theta_{SA}}$$

where $\theta_{SA}$ is a far-field divergence angle in a slow axis direction.

11. The beam combining apparatus according to claim 8, wherein the cylindrical lens has a focal length $f_{FA}$ ranging between 0.7 mm and 2.5 mm.

12. A diode laser beam combining apparatus for producing a required far field aspect ratio output beam, comprising:
  an array of semiconductor laser emitters arranged in a collinear manner with respect to each other and having an emitter pitch;
  a cylindrical lens for collimating emitter beams generated by the array of laser emitters in a direction perpendicular to a junction plane of the laser emitters;
  a micro-optic array configured to perform rotational transformation of the collimated emitter beams, said micro-optic array having a lateral spacing in a direction parallel to the junction plane of the laser emitters that matches the emitter pitch; and
  a long focal length cylindrical lens for collimating emitter beams in the direction perpendicular to the junction plane after passing through the micro-optic array, where the required far field aspect ratio of the output beam is achieved by selection of the focal lengths $f_{FA}$ and $f_{SA}$ of the cylindrical lens and the long focal length cylindrical lens wherein a square-shaped output far field distribution is achieved by selecting the focal lengths $f_{FA}$ and $f_{SA}$ of the collimating cylindrical lenses to satisfy the following relation:

$$\frac{f_{FA}}{f_{SA}} = \frac{w_{SA}}{\frac{\lambda}{2\tan(\theta_{FA})} + h_S + h_M}$$

(5)

where WSA is the width of the individual emitter apertures in the slow axis direction, $\lambda$ is the wavelength of the laser radiation, and $\theta_{FA}$ is the far field beam divergence in the fast axis direction, $h_S$ is the diode bar smile value, and $h_M$ represents optics misalignments such as those caused by post-bonding shifts.

* * * * *